M. A ROSANOFF.
PROCESS OF AND APPARATUS FOR FRACTIONATION.
APPLICATION FILED APR. 29, 1911.

1,171,464.

Patented Feb. 15, 1916.

Witnesses:
C. F. Wesson
E. M. Allen

Inventor:
M. A. Rosanoff
By Attorneys
Southgate & Southgate

UNITED STATES PATENT OFFICE.

MARTIN A. ROSANOFF, OF WORCESTER, MASSACHUSETTS.

PROCESS OF AND APPARATUS FOR FRACTIONATION.

1,171,464. Specification of Letters Patent. Patented Feb. 15, 1916.

Application filed April 29, 1911. Serial No. 624,134.

*To all whom it may concern:*

Be it known that I, MARTIN A. ROSANOFF, a citizen of the United States, residing at Worcester, in the county of Worcester and State of Massachusetts, have invented a new and useful Process of and Apparatus for Fractionation, of which the following is a specification.

This invention relates to a process of fractionation, that is the separation of a given mixture into two or more fractions of unequal compositions, and to an apparatus for carrying out that process.

The principal objects of the invention are to provide a practical process for this purpose, whereby a mixture of vapors or volatile substances can be separated entirely or to any desired degree by a minimum number of fractionations; also to provide a process for this purpose based on scientific principles by which this result can be obtained in a simple, efficient and practicable manner with a minimum number of cooling zones, and consequently with a minimum amount of apparatus, so that it may be done at an expense not much greater than has been incurred ordinarily by the usual fractional distillation processes; and to provide simple, convenient, and inexpensive apparatus for carrying out this method and securing these results.

Further objects and advantages of the invention will appear hereinafter.

Reference is to be had to the accompanying drawings in which—

The principles involved in the ordinary processes of fractional distillation are well known. They have been practised for many years without substantial improvement in the method of operation, although the apparatus has been subjected to numerous improvements of a minor nature, based entirely, so far as I am aware, on the principles which have been practically employed in this industry for years. Although it has been desired for several decades to secure a simple single-step distillation process and much effort has been directed to that end, yet so far as I am aware the methods thus far proposed have been indirect and more or less cumbersome. A simple method was proposed theoretically some thirty years ago, but it never could be carried out practically. This method, briefly stated, consists in providing a constant temperature cooling zone in the path of the vapors from the heating zone to the condensing zone. The temperature at which this was kept was the boiling point of the mixture giving off the vapor of the composition which it was desired to produce. It is not necessary at this stage to state how this theory was discovered or in what respects it proved impractical and incapable of application.

Figures 1, 2:
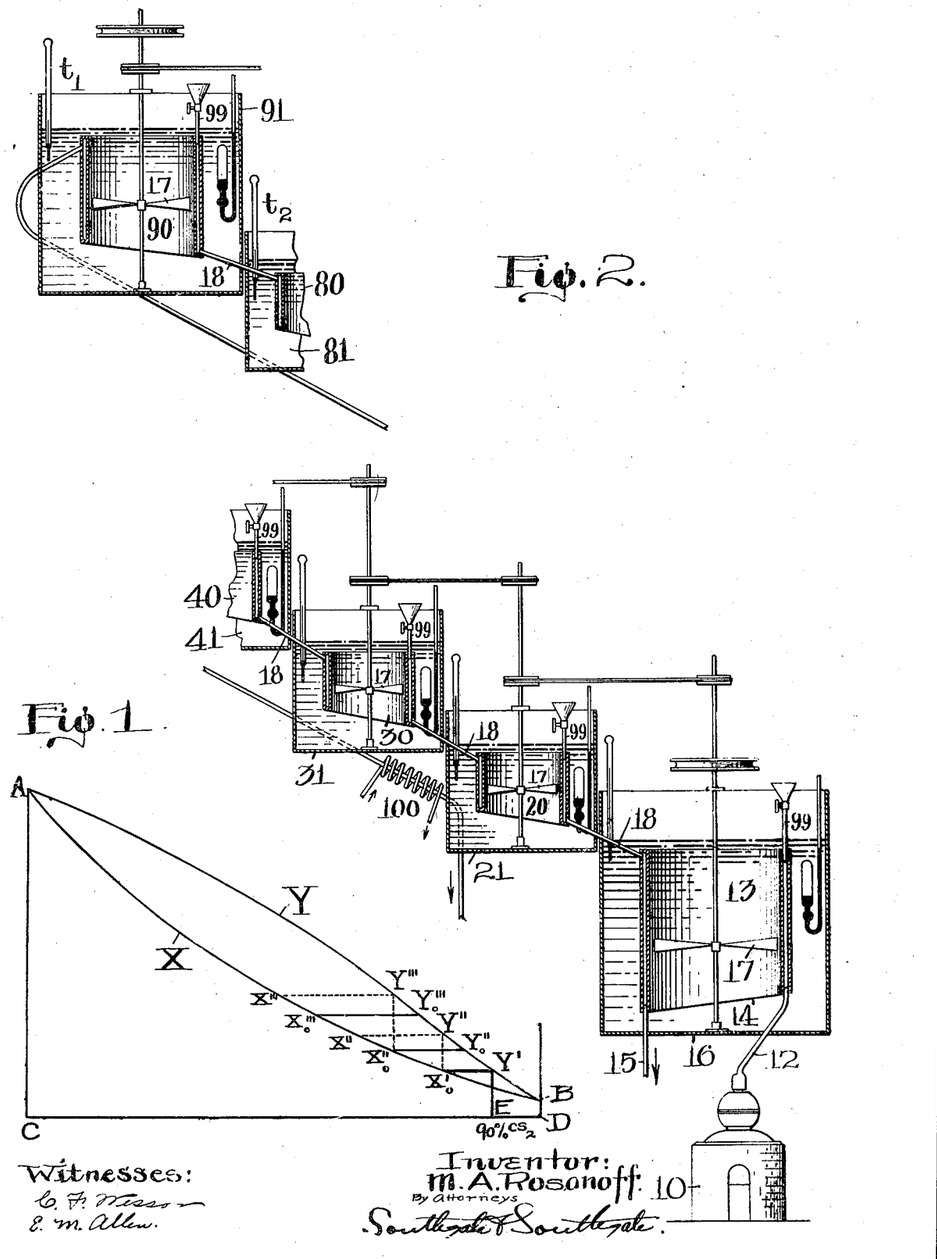
Figure 1 is a theoretical diagram by which the method can be explained.
Fig. 2 is a side elevation, partially diagrammatical, of an apparatus for carrying out this invention, said apparatus being constructed in accordance therewith.

For the purpose of explaining my new method, reference is to be had to the diagram (Fig. 1). Part of this is based on this old theory that I have mentioned, and the rest represents the advantage which I have obtained over that.

In order to plot the curve represented in this diagram, I make a series of mixtures of two substances. It will be understood that these are the two substances which constitute the components of the mixture which it is desired to fractionate. It is convenient to make nine mixtures of the pure substances, one containing 10% of one substance which I designate K, and 90% of the other substance L by weight. The next mixture contains 20% of K and 80% of L, and so on. In addition to these I have at the two ends of the series of the pure substance K and the pure substance L. Now by means of a suitable ebulliscope I determine the boiling points of these mixtures. Then let the lines C D represent 100%. The distance CD then will indicate the pure substance L, while the distance CE which is 90% of the distance CD will represent the mixture which contains 90% L and 10% K. The point C represents the substance K in a pure condition. I then draw vertical lines from this line C D, each one, of course, representing a certain percentage of each substance. Therefore, these vertical lines represent the several mixtures which I have made. The temperatures at which these various mixtures of the two substances boil are then laid off on the respective vertical lines. The distance AC indicates the boiling point of the pure substance K, the distance DB, the boiling point of the pure substance L. The lower curve AXB is drawn from the points so obtained and furnishes a curve by which the boiling point of any mixture of these two substances can be obtained by obvious means.

Now if certain mixtures of the vapors be kept at a constant temperature between the two extremes represented in the diagram, the vapor which will emerge from this constant temperature zone will have a constant composition, namely, the composition of the vapor given off by the mixture boiling at said constant temperature. The curve AYB is plotted to represent the vapor compositions corresponding to all possible mixtures of the given pair of substances. In order to plot this line, the same mixtures can be used if desired. Each one of these is maintained at its boiling temperature and the composition of the vapor emitted is determined in any desired way. It is not necessary to state the method of determining the composition here, but there are several methods that can be used. Three of these have been devised by me and fully described by me in a series of papers published in the *Journal of the American Chemical Society* and in the *Zeitschrift für Physikalische Chemie*. The compositions of these vapors are determined in percentages of the two components and new vertical lines are drawn from the line C D, each indicating the relative percentages, as for example, if one of the vapors given off contains 12% of the substance K and 88% of the substance L, then the vertical line representing it is located at a point 88% of the distance CD from the point C. On each of these vertical lines is laid off a distance from the line C D, representing the temperature of this vapor as given off, which is also obviously the temperature of the boiling point of the liquid mixture by which the vapor was emitted. In this way a series of points are obtained through which a smooth curve AYB is drawn which I call the vapor composition curve.

To find the composition of the vapor given off by keeping the mixed vapors at a constant temperature, draw a vertical line from the point of intersection of the constant temperature level with the line A Y B. The relative distances of the vertical line from A C and B D will represent the proportions of the two substances. This is the old theory, and within certain limits, the nature of which I have discovered, it is correct. But it was supposed that the theory meant that by keeping the temperature of this constant temperature zone the same as the temperature of boiling of the liquid having the lower boiling point, the vapor product of the distillation would be the pure lower boiling liquid, and all of that liquid contained in the original mixture. As a matter of fact, after the distillation had gone on for a little while, the production of the vapor of the liquid having the lower boiling point was so slight and slow that it rendered the method impractical for that purpose.

Now, I have discovered that if a liquid having a lower boiling point than the temperature of the constant temperature zone is introduced into the latter, the liquid remaining unvaporized and emerging as such from the constant temperature zone will have the temperature of such constant temperature zone as its boiling point. From this it follows that if a vapor or liquid introduced into the constant temperature zone has the composition of the liquid boiling at the temperature thereof, or of a liquid boiling at a higher temperature than that of the constant temperature zone, no vapor will emerge as such from the constant temperature zone at all.

I have discovered also that if a liquid having a lower boiling point than the constant temperature zone is introduced into the latter, and the vapor emerging from the zone is caused to enter a second constant temperature zone whose temperature is below that of the saturated vapor entering it, but not below the boiling point of the liquid mixture having the composition of that saturated vapor, then the vapor emerging from the second zone will have the constant composition of the vapor given off by the mixture boiling at the temperature of the second zone, while the liquid emerging from the first zone will have the constant composition of the mixture whose boiling point is identical with the temperature of that first zone.

Similarly I have discovered that if a saturated vapor of a temperature above that of a given constant temperature zone, but more or less lower than the temperature of the saturated vapor which on complete condensation would yield a liquid mixture boiling at the temperature of the given constant temperature zone, when such a vapor is introduced into the given constant temperature zone, the result is, in the first place, that a vapor finally emerges from the given zone identical with the vapor given off by the mixture whose boiling temperature is also the temperature of the given zone. If, moreover, the condensate is allowed to flow into a second zone kept at a constant temperature intermediate between the temperature of the first zone and the temperature of a saturated vapor which on complete condensation would yield a liquid mixture boiling at the temperature of the same first zone, then the liquid condensate finally emerging from the second zone will have the constant composition of the mixture whose boiling point is identical with the temperature of the second zone, while the vapors returned from the second zone into the first will in no way interfere with the constant composition of the vapors emerging from the first zone.

If in either of the cases specified in the preceding two paragraphs the constant vapor emerging from the cooler zone is caused to enter a still colder zone, the temperature of which is fixed in accordance with the new principles discovered by me and just explained, the vapor emerging from this new zone will be richer in the more volatile component than the vapor obtained without the use of this new zone. On the other hand, if in either of the cases specified in the two preceding paragraphs the constant liquid emerging from the warmer zone is caused to enter a still hotter zone, the temperature of which is likewise fixed in accordance with the new principles discovered by me and explained above, the liquid emerging from this new hot zone will be richer in the less volatile component than the condensate obtained without the use of such an additional zone. A plurality of such zones can be added and connected in the same way until an entire separation of the two liquids is secured. In this case the fluid mixture passes through a plurality of substantially constant temperature zones connected in series and maintained at progressively differing temperatures so as to pass a mixture of substantially constant composition from each zone to the next, the temperature of each zone being the temperature at which the mixtures emanating therefrom would initially change their states of aggregation by boiling or condensation, the temperature of each zone differing from those of the adjacent zones only to such an extent as will not permit of complete change in the state of aggregation, that is, the complete condensation of a vapor mixture or the complete vaporization of a liquid mixture.

In further explanation I may remark that from the warmest zone a liquid may thus be directly produced which (if this zone is of the temperature of the boiling point of the one of the components of the original mixture having the higher boiling point,) will yield that component substantially in its pure condition. The vapors produced in each cooling zone will pass along into the next cooling zone and there condensation will take place, yielding a liquid of a composition which when it runs back into the next warmer zone will be within the range of that zone, so to speak, and on being partially vaporized therein will produce a vapor and a liquid, one going in one direction and the other in the other direction as has been explained heretofore. It will be seen therefore that coming through the whole series in the last (coolest) cooling zone a vapor will be evolved which will be substantially the pure vapor of the liquid having the lower boiling point and a liquid will there be produced which will be partially revaporized in the cooling zones into which it runs back. In this way it will be seen that the process is automatic and continuous. It will be seen further that the entire mixture, no matter what its original composition, can be separated in this way by a single process and by the use of comparatively simple apparatus.

It is to be understood that while I have shown a theoretical diagram and explained the invention as applied thereto, the invention is not limited to this precise arrangement, because for example, if it is not desired to secure either or both of the products in their pure state, one or more of the steps at either or both ends of the series may be omitted.

In Fig. 2 I have shown an apparatus for carrying out this process. Here a mixture of liquids is located in a container or still 10 which is heated in any desired way. The vapors produced are conducted through a tube 12 into a receptacle 13 which has a bottom 14 slanting down toward one corner, and is provided with a discharge pipe 15 at the bottom. This container is shown as of a hollow annular form, and it is inclosed in a constant temperature receptacle 16 which can be of any desired kind. It is shown as having a circular stirrer 17 within the hollow walled cylindrical receptacle 13, so that this receptacle is cooled outside and in and kept at a constant temperature. The constant temperature can be maintained in any desired way, as by the use of a mixture of liquids and melting solids, by electrical means, etc. This receptacle can be of any desired width between its walls within practical limits, but I find in practice that it should be narrow. For ordinary liquids which I have employed and the temperature which I have found it necessary to use in accordance with this method a space of an eighth of an inch between the walls is suitable if the walls are of copper.

The receptacle 13 has a conductor 18 extending from the upper corner remote from the conductor 12 and slanting upwardly. This is connected at its upper end with the lower end of a receptacle 20 constructed substantially like the receptacle 13 except that its bottom slants in the opposite direction down toward the top of the latter. The receptacle 20 is located at a higher level than the receptacle 13 and in fact the lowest portion of its bottom is higher than the top thereof so that the conductor 18 can slant continuously back thereto. This receptacle 20 is contained in a constant temperature receptacle 21 which is kept at a lower constant temperature found in accordance with the principles enunciated above. Above the receptacle 20 are a series of receptacles 30, 40, 80, 90, etc., each of the same shape as the receptacle 20 and all having the same relations to each other. Each one is contained in a constant temperature container 31, 41, 81, 91, etc. at temperatures of $t$, $t_2$, etc. respectively, corresponding with the principles announced above and the diagram in Fig. 1. The one 90 having the lowest temperature is connected with a condenser 100 of any ordinary type. This is not illustrated in detail herein.

As a specific example of the use of the apparatus, it may be assumed that it is being employed for separating a mixture of carbon tetrachlorid and carbon disulfid. Whatever the proportions in which these two substances are mixed, the apparatus and process of distillation according to this invention are substantially the same. Carbon tetrachlorid has, under normal atmospheric pressure, a boiling point of approximately 76 degrees centigrade and carbon disulfid 46 degrees. Therefore in Fig. 1 the point A represents 76 degrees and the point B 46 degrees. The lower curve AXB represents the boiling points of various mixtures of these two substances.

The data needed for the determination of these temperatures involve the use of boiling point curves AXB and of vapor composition curves AYB.

For the determination of the boiling point curve of carbon disulfid and carbon tetrachlorid, pure carbon disulfid was introduced into the equilibrium chamber of a special apparatus devised by me for the determination of the partial vapor pressures of binary mixtures, and vapor from carbon disulfid boiling in a glass jacket surrounding the equilibrium chamber was allowed to bubble through the liquid in the equilibrium chamber until a sensitive thermometer graduated in twentieths of a degree centigrade and calibrated for me at the U. S. Bureau of Standards in Washington, had ceased to show rising temperature in the liquid carbon disulfid within the equilibrium chamber. An atmospheric pressure of exactly 760 millimeters was then established, with the aid of a 100 liter manostat tank, within both the equilibrium chamber and the surrounding jacket, and after the temperature within the former had again ceased changing, the sensitive thermometer just mentioned indicated the boiling point of pure carbon disulfid. In a similar manner was determined the boiling point of pure carbon tetrachlorid, and again in a similar manner the boiling points of ten different mixtures of the two substances. Only, in the case of each of the mixtures the outside jacket also contained a mixture of the two substances, and the composition of that mixture was maintained constant while vapor was boiled off from it by continuously introducing into it more or less of the more volatile component. In the case of the mixtures, after the boiling points of the liquid in the equilibrium chamber had been thus determined a sample of that liquid was pipetted out and its composition determined refractometrically. The exact weight percentages of the twelve liquids whose boiling points and compositions were now known, were next marked along a line corresponding to C—D in Fig. 1 as abscissæ on cross section millimeter paper, one millimeter denoting 0.2 per cent. The boiling points of the pure substances and of the several mixtures in degrees centigrade were then marked as ordinates from the line C—D corresponding to the several abscissæ, one millimeter in the direction of the ordinates denoting 0.1° C. Finally the upper ends of the twelve ordinates thus obtained were tied by drawing through them a smooth curve, which constituted the required boiling point curve as AXB. On this boiling point diagram it was obviously easy to read off the boiling point corresponding to any percentage mixture of carbon disulfid and carbon tetrachlorid, or to read off the percentage corresponding to any boiling temperature between those of the two components in the isolated state.

The method described in the preceding paragraph was also employed in determining the boiling point curves in the case of mixtures of carbon disulfid and acetone and also of chloroform and acetone. On the other hand, in the case of mixtures of aceton and toluene and also of benzene and toluene the boiling point curves were determined with the aid of an Oddo ebullioscope. Thus, in the case of benzene and toluene, these two substances in the isolated state and nine mixtures of exactly known composition, containing respectively about 10, 20, 30, 40, 50, 60, 70, 80 and 90 per cent. benzene by weight were consecutively introduced into the glass boiling tube of the ebullioscope and the boiling points determined in the usual manner, with the aid of sensitive thermometers similar to the one mentioned above. The boiling points so determined were plotted as described above against the compositions of the corresponding eleven liquids, giving the required boiling point curve.

The vapor composition curves for the various mixtures have been determined by three different methods which I have devised for the purpose. In the case of carbon disulfid and carbon tetrachlorid mixtures I have employed the following method; which promises to be of especial value in connection with industrial distillation enterprises, owing to its rapidity and simplicity. A mixture of carbon disulfid and carbon tetrachlorid of precisely known composition was subject to distillation in a special apparatus, permitting of no reflux condensation, seven consecutive fractions of the distillate were separately collected, weighted, and analyzed. The composition of the residue in the apparatus was also determined by analysis. A simple calculation then revealed the composition of the liquids that would have been obtained by mixing fractions No. 1 and No. 2, Nos. 1+2+3, Nos. 1+2+3+4, Nos. 1+2+3+4+5, Nos. 1+2+3+4+5+6, Nos. 1+2+3+4+5+6+7 and on the other hand Nos. 7+6, Nos. 7+6+5, Nos. 7+6+5+4 Nos. 7+6+5+4+3 Nos. 7+6+5+4+3+2 and Nos. 7+6+5+4+3+2+1. The results were now plotted as follows: The weight of No. 1 was entered as an abscissa and its composition as an ordinate; the aggregate weight of Nos. 1+2 was made another abscissa and the calculated aggregate compositions of Nos. 1 2 was made the corresponding ordinate; etc. The same was done for fractions Nos. 7+6 Nos. 7+6+5, etc. The resulting points gave a pair of smooth curves that met at the point representing the aggregate weight and composition of fractions Nos. 1+2+3+4+5+6+7. Graphic extrapolation of the two curves to the vertical line representing zero weight of distillate gave a pair of points on that line representing, respectively, the composition of the vapor in equilibrium with the original mixture and the composition of the vapor in equilibrium with the residue in the apparatus. These two compositions were now entered upon the diagram showing the boiling point curve of carbon disulfid and carbon tetrachlorid mixtures, each composition being denoted by a point on the horizontal line passing through the boiling point of the original mixture and the residue, respectively, and thus were obtained two points of the vapor composition curve. Next a new mixture of carbon disulfid and carbon tetrachlorid was prepared to start from, and the process was repeated, giving two more points of the vapor composition curve, and so on, until a number of such points were obtained. The curve met the two terminal points of the boiling point curve, because the isolated component corresponding to each of the terminal points must necessarily give off a vapor containing nothing but that component, so that liquid and vapor are identical in composition. The same method was used for determining the vapor composition curve in the case of mixtures of acetone and toluene.

The results obtained by the method just described were, in the case of carbon disulfid and carbon tetrachlorid, in sufficient agreement with the results obtained by another method which I have devised for determining the vapor composition curves of liquid mixtures. This other method, which was partly described above in connection with the determination of boiling point curves, and which was employed exclusively in the cases of mixtures of carbon disulfid and acetone and of chloroform and acetone, is as follows:—An arbitrary mixture is placed in the equilibrium chamber of the apparatus employed, a similar mixture is placed in the surrounding glass jacket and boiled with the aid of an electric resistance heater, the composition of the liquid in the jacket being maintained constant by continuous addition of the more volatile component; the vapor from the liquid boiling in the jacket bubbles through the liquid in the equilibrium chamber, raises its temperature to the boiling point, and changes its composition until equilibrium is established between liquid and vapor; when this has taken place, the sensitive thermometer in the equilibrium chamber indicates a constant temperature (the boiling point of the liquid then in the equilibrium chamber). Enough of the vapor issuing from the equilibrium chamber is now collected in condensed form for analysis, and finally a sample of liquid from the equilibrium chamber is analyzed. The composition of the vapor is entered as described above, upon the diagram showing the boiling point curves, and thus is obtained one point on the vapor composition curve. The process is repeated until a number of such points are obtained sufficient to indicate the shape of the vapor composition curve throughout its extent.

Finally a third method was employed in the case of mixtures of benzene and toluene. In this method, which can be used with all binary mixtures in which the heat involved or absorbed when the two components are mixed is moderate, the experimental work is slight in amount and extremely simple. The method is based on a theoretical relationship which I have discovered between the differential coefficient of the total vapor pressures of binary mixtures and the relative weights of the two components in liquid and vapor. I have found, namely, that if $\pi$ denotes the total vapor pressure of a binary mixture and $x$ the molar fraction (i. e., one one-hundredth of the molar per cent.) of the component whose vapor pressure in the isolated state at the same temperature is denoted by $P_1$, while the vapor pressure of the second pure component is denoted by $P_2$, then $$\frac{d\pi}{dx} = \frac{P_1 - P_2}{\log P_1 - \log P_2} \log \frac{g'_1 g_2}{g'_2 g_1},$$

where $g_1$ and $g_2$ represent the relative weights of the two components in the liquid, and $g'_1$ and $g'_2$ represent the relative weights of the two components in the vapor. On the other hand, $$\log \frac{g'_1 g_2}{g'_2 g_1} = \log \frac{P_1}{P_2} + a + bx + cx^2 + dx^3,$$

where the coefficients $a$, $b$, $c$, and $d$ are, as I demonstrated in the year 1909, practically independent of the temperature.

In accordance with these relationships, the vapor composition curve of mixtures of benzene and toluene was determined as follows. I first determined the total vapor pressures, at the temperature of 79.70° C., of pure benzene, pure toluene, and a series of mixtures containing respectively about 10, 20, 30, 40, 50, 60, 70, 80, 90, and 95 per cent. of benzene. For each of these liquids the determination was carried out by introducing the liquid into an Oddo ebullioscope connected with a manostat tank in which different pressures could be maintained constant within one-tenth of one millimeter, setting the liquid in the ebullioscope boiling vigorously, and searching for the pressure under which a sensitive ebullioscope thermometer indicated the boiling-temperature of 79.70° C. The several pressures thus found were expressed with the aid of the method of least squares in terms of the molar fractions of the several corresponding liquids by the following parabolic equation of the fourth degree:

$$\pi = 288.438 + 466.519x - 56.464x^2 + 100.281x^3 - 49.971x^4.$$

From this I obtained by differentiation:

$$\frac{d\pi}{dx} = 466.519 - 112.928x + 300.843x^2 - 199.884x^3.$$

On the other hand, $$\frac{\log_{.10} P_1 - \log_{.10} P_2}{P_1 - P_2} = 0.0009.$$

Therefore, $$\frac{\log_{.10} P_1 - \log_{.10} P_2}{P_1 - P_2} \cdot \frac{d\pi}{dx} = \log_{.10} \frac{g'_1 g_2}{g'_2 g_1} = 0.4198671 - 0.1016352x + 0.2707587x^2 - 0.1798956x^3,$$

an equation which holds true at 79.70° C.

Further, on the basis of Regnault's measurements of the vapor pressures of pure benzene and pure toluene between 80° and 110° C., I found, again with the aid of the method of least squares, $$\frac{P_2}{P_1} = 0.2641 + 0.001506t,$$

where $t$ denotes the temperature centigrade, and hence for the specified temperature interval:

$$\log_{.10} \frac{g'_1 g_2}{g_1 g'_2} = 0.0043433 - 0.1016352x + 0.2707587x^2 - 0.1798956x^3 - \log_{.10}(0.2641 + 0.001506t).$$

The boiling-point curve of benzene-toluene mixtures having been determined previously, the temperature $t$ corresponding to any molar fraction $x$ could be found easily, and if the quantities $g_1$, $g_2$, $g'_1$, $g'_2$ were supposed to represent percentages by weight, the weight per cents $g'_1$ and $g'_2$ in the vapor corresponding to any molar fraction $x$ and weight per cents $g_1$ and $g_2$ in the liquid, became known. For a fuller description of the principle underlying this method, see my paper in the *Journal of the Franklin Institute* for December, 1911.

The calculation just outlined was carried out for a series of weight per cents, and thus was obtained a sufficient number of points to clearly indicate the shape of the vapor composition curve, which is shown in Fig. 1.

The upper curve AYB permits of ascertaining the composition of the vapors given off by a liquid mixture of any given composition, as follows:—Divide the abscissa line C D into two parts in the ratio of the quantities of the two components of the given liquid mixture; from the point so dividing the line C D draw a perpendicular line to meet the curve AXB; from the point of intersection of the perpendicular with the curve AXB draw a horizontal line to meet the curve AYB; finally, from the point of intersection of the horizontal line with AYB draw a perpendicular back to the line C D; the point of intersection of the last named perpendicular with C D will divide C D in the ratio of the quantities of the two components in the vapors given off by the given liquid mixture.

Let it now be required to divide a given mixture of carbon disulfid and carbon tetrachlorid (containing less than 90% carbon disulfid) into nearly pure carbon tetrachlorid and a mixture containing 90% carbon disulfid. On the basis of the two new principles discovered by me and explained above, the procedure to be followed may be ascertained from Fig. 1 as follows: The perpendicular E $Y_0'$ is drawn from the point E at 90% of the distance from C to D, and therefore representing 90% carbon disulfid; next the line $Y_0' X_0'$ is drawn parallel to C D. This line $Y_0' X_0'$ represents the temperature ($t_1$ in Fig. 2) at which the coolest of the combination of constant temperature zones must be kept in order that the vapor may contain constantly 90% carbon disulfid. The temperature at which the next warmer zone must be kept is now to be found as follows: In accordance with the new principles enunciated above, if a vertical line $X_0' Y''$ were drawn, and from the point $Y''$ the horizontal line $Y'' X''$ were further drawn between the two curves, the horizontal line $Y'' X''$ would represent the temperature which would make the zone in question just too warm for the desired separation to be at all possible. In practice the temperature of that zone will be kept intermediate between the temperatures represented by the line $X_0' Y_0'$ and $Y'' X''$; the temperature maintained in practice may be represented by the line $X_0'' Y_0''$ ($t_2$). Similarly in accordance with the principles enunciated above, the maximum temperature of the following still warmer zone may be found by drawing the vertical line $X_0'' Y_0''$ and the horizontal $Y'''' X''''$. In practice again that third zone will be kept, not at the temperature $Y''''X''''$, but intermediate between $Y''''X''''$ and $X''Y''$; for instance, at the temperature represented by the line $X_0'''' Y_0''''$. Continuing the same procedure, the number of cooling zones and the temperature below which each zone must be kept in order that the liquid separation should be a possibility, can be ascertained. It may be added that the warmest zone should be kept at a temperature slightly below the boiling point of carbon tetrachlorid.

It is to be understood of course that the process can commence or terminate at any point along the diagram according to the materials at hand and the products desired. If we have a mixture of the vapors to start with, we put it into the receptacle having the next lower temperature. Valved tubes 99 are shown for this purpose. They can be used also for introducing liquid mixtures. Thus this invention provides the means for telling at once where in the series to introduce the raw material in order to get the best and quickest result.

It will be seen that while the theoretical diagram is not followed, yet it is strictly the basis of the whole process, and that the process agrees with it both theoretically and practically in every detail. The carrying out of the process based on this theory results in an exceedingly, simple, convenient, inexpensive, and practical operation for the fractionation of mixtures of two or more substances, and it is of such a nature that the apparatus involved is very simple as will be seen. The process takes the place of a series of successive fractional distillations, and of the industrial methods used hitherto, which are purely empirical and therefore by no means of the highest degree, in simplicity of means required, in economy, or in purity of the products.

Important features of the invention are the absolute certainty that at least the necessary minimum number of cooling zones having the proper temperatures has been provided, and that the distillation can take place with a great degree of rapidity to secure the desired products, rendering it unnecessary to experiment to get the proper number of cooling zones, and eliminating all uncertainty as to where to introduce a mixture in the series.

The above explanations refer throughout, for simplicity's sake, to Fig. 1 representing a case in which the boiling point curve has neither a maximum nor a minimum between its ends. If a given pair of substances has a boiling point curve with either a maximum or a minimum, then the above principles and explanations will apply equally well, provided the diagram is divided into two parts by a vertical line passing through the minimum or maximum of the curve and the above principles and explanations are applied separately to the two parts of the diagram.

What has been said is strictly true with regard to all suitable binary mixtures. It is also true of all suitable ternary mixtures or suitable mixtures of four or more substances, provided the fluid introduced into the constant temperature zone be constant in composition. That is to say, if a ternary mixture, whether in the state of liquid or vapor, of a certain constant composition be introduced directly into one of the temperature zones, then both the liquid and the vapor that escape from the zone will be of constant composition. If, however, the ternary mixture introduced into a constant temperature zone varies progressively in composition, as does, for instance, a vapor emanating from a boiling liquid mixture of three substances, then the liquid and the vapor escaping from the zone will likewise vary progressively in composition. This is due to the fact that three given substances can form an infinite number of mixtures that boil at one and the same temperature point. However, the variation of the vapor and liquid escaping from the zone will be strictly confined within more or less narrow limits determined by the temperature of the zone. I have found experimentally that if the composition of a ternary mixture originally introduced into the zone does not exceed the limits defined elsewhere in this specification, then the vapor escaping from the zone will at every instant be a vapor given off by some liquid which has its boiling-point at the temperature of the zone. This limits at every instant the volatility of the distillates obtained by my process, and as all the above statements regarding ternary mixtures are true also of mixtures of any higher degree of complexity, it is obvious that my process may be used for the purpose of obtaining distillates of any desired degree of volatility from complex natural mixtures; for instance, gasolenes of a certain definite quality from petroleum.

Although I have illustrated and described a preferred procedure and construction of apparatus, I am aware that the invention can be carried out with variations in details without departing from the scope of this invention as expressed in the claims. Therefore, I do not wish to be limited to all the details of the method or to the apparatus herein shown and described, or to the application thereof to binary mixtures only, but What I do claim is:—

1. The process of separating a mixture of substances to obtain a condensate having a constant composition, which consists in subjecting a mixture to the action of a constant temperature zone having the boiling point of the desired condensate as its constant temperature, the liquid acted upon having an initial boiling point below the temperature of the zone but not below the initial boiling point of the completely condensed vapor given off by the mixture of the same substances boiling at the temperature of the zone.

2. The process of separating mixed substances to obtain a condensate and a vapor or vapor mixture each having a predetermined composition, which consists in subjecting a liquid mixture or condensate to the action of a constant temperature zone having the boiling point of a desired condensate as its constant temperature, connecting this first zone with another constant temperature zone having the temperature of condensation of a desired vapor or vapor mixture as its constant temperature, and allowing the vapor from the first named zone to pass into the second zone and the condensate from said second zone to pass into the first zone, the liquid or condensate acted upon having an initial boiling point below the temperature of the zone into which it is introduced, but not below the initial boiling point of the completely condensed vapor given off by the liquid mixture of the same substances boiling at the temperature of that zone, and the vapor mixture acted upon having an initial temperature of condensation above the temperature of the zone into which it is introduced but not above the boiling point of the liquid mixture of the same substances whose vapor, completely condensed, would have the temperature of the last mentioned zone for its boiling point.

3. The process of separating mixed substances to obtain a condensate and a vapor or vapor mixture each having a predetermined composition, which consists in subjecting a liquid mixture or condensate to the action of a constant temperature zone having the boiling point of a desired condensate as its constant temperature, connecting this first zone with another constant temperature zone of lower temperature having the temperature of condensation of a desired vapor or vapor mixture as its constant temperature, and allowing the vapor from the first named zone to pass into the second zone and the condensate from said second zone to pass into the first zone, the liquid or condensate acted upon being that condensed in the second zone having an initial boiling point below the temperature of the zone into which it is introduced, but not below the initial boiling point of the completely condensed vapor given off by the liquid mixture of the same substances boiling at the temperature of that zone, and the vapor mixture acted upon being that vaporized in the first zone having an initial temperature of condensation above the temperature of the zone into which it is introduced but not above the boiling point of the liquid mixture of the same substances whose vapor, completely condensed, would have the temperature of the last mentioned zone for its boiling point.

4. The process of separating mixed substances to obtain a vapor mixture having a constant composition which consists in subjecting a mixed saturated vapor to the action of a constant temperature zone having the initial temperature of condensation of the desired vapor as its constant temperature, the mixed saturated vapor acted upon having an initial temperature of condensation above the temperature of the zone but not above the boiling point of the liquid mixture of the same substances whose vapor, completely condensed, would have the temperature of the zone for its boiling point.

5. The process of separating mixed substances which consists in passing the mixture along a course, subjecting the same to the action of constant temperatures in a plurality of different zones along said course, the constant temperature of each zone being above the initial boiling point of the liquids condensed in the next cooler zone, and allowing a condensate to pass into the next warmer zone from a cooler zone.

6. The process of separating mixed substances which consists in passing the mixture along a course, subjecting the same to the action of constant temperatures in a plurality of different zones along said course, the constant temperature of each zone being above the initial boiling temperature of the condensed vapors given off in the next warmer zone and allowing a condensate to pass into the next warmer zone from a cooler zone.

7. The process of separating mixed substances which consists in passing the mixture along a course, subjecting the same to the action of constant temperatures in a plurality of different zones along said course, the constant temperature of each zone being above the initial boiling point of the mixture of liquids condensed in the next cooler zone, and above the initial boiling temperature of the completely condensed vapors given off in the next warmer zone.

8. The process of separating mixed liquids which consists in heating the mixture to produce a mixture of vapors, passing said vapors to a condenser, and subjecting the mixture of vapors to the action of constant temperatures in a plurality of different zones along their course from the heating region, the constant temperature in each zone being of such degree that the vapors which are given off therefrom will have an initial temperature of condensation above the temperature of the zone having the next lower temperature, and the condensate will be a mixture having an initial boiling point below the temperature of the zone having the next higher temperature.

9. A process of separating a mixture which consists in heating the mixture to produce a mixture of vapors, leading the vapors to a condensing apparatus, and cooling the vapors on the way to the condensing apparatus by subjecting the mixture of vapors which comes from the heating region to the action of a constant temperature, and subjecting the mixture of vapors issuing from such cooling zone to the action of a lower constant temperature, but higher than the initial boiling point of the completely condensed mixture of vapors issuing from the first cooling zone.

10. A process of separating mixed liquids which consists in heating the mixture to produce a mixture of vapors, leading the vapors to a condensing region, subjecting the mixture of vapors which comes from the heating region to the action of a constant temperature of a lower degree than that of the heating region, and subjecting the mixture of vapors issuing from such cooling zone to the action of a constant temperature below the initial temperature of condensation of the mixture of vapors given off from the first cooling zone, and of such degree that the mixture of liquids condensed therein will have an initial boiling point lower than the temperature of the first cooling zone.

11. The process of separating mixed vaporizable substances which consists in passing the mixture to a condenser through a plurality of different zones along a course and maintaining each zone under such constant conditions that the mixture of vapors given off from it will have an initial temperature of condensation higher than the temperature of the next succeeding zone at the pressure thereof, and the condensate will have an initial boiling point lower than the temperature of the next preceding zone at the pressure thereof.

12. The herein described process of effecting the fractionation of a fluid mixture to obtain a fluid whose composition is different from that of the original mixture, which process consists in causing a mixture of substantially constant composition to pass through a constant temperature zone maintained at practically the temperature at which the desired product would begin condensing if a vapor, or begin boiling if a liquid; the temperature of the zone being intermediate between the temperatures of initial and complete condensation of the fluid if this is a vapor, or between the initial boiling point and the temperature of complete vaporization of the fluid if this is a liquid.

13. The herein described process of carrying out the fractionation of a fluid mixture so as to obtain a fluid of constant composition, which process consists in causing the fluid mixture to pass through a plurality of substantially constant temperature zones, connected in series and maintained at progressively differing temperatures, so as to pass a mixture of substantially constant composition from one zone to another, the temperature of each zone being the temperature at which the mixtures emanating therefrom would initially change their states of aggregation, the temperature of each zone differing from those of the adjacent zones only to such an extent as will not permit of complete change in the state of aggregation of the mixtures reaching said zone from the two adjacent zones.

14. In an apparatus of the character described, the combination of means for introducing a mixture of substances into a receptacle, means for keeping the mixture in said receptacle at a constant temperature of such degree as to cause a separation of the most volatile from the least volatile substances, means for keeping at a constant but lower temperature the vapors issuing from said receptacle, and means for condensing the vapors produced from the last named means, each of said means having provisions whereby the liquids condensed therein can drain back into the means from which it receives its vapors.

15. In an apparatus of the character described, the combination with means for heating a mixture of liquids, and means for condensing the vapors, of a plurality of devices arranged intermediate between said means, each for receiving a mixture of vapors, cooling them to a definite temperature, discharging the condensation products back toward the heating means, and discharging the uncondensed vapors into the next of said devices, which devices are arranged in a series between the heating means and the condensing means, each one being at a higher temperature than those between it and the condensing means.

16. In an apparatus of the character described, the combination with means for heating a mixture of liquids and means for condensing the vapors, of a plurality of devices arranged in a series intermediate between said means, each for receiving a mixture of vapors, cooling them to a definite temperature, discharging the condensation products back toward the heating means, and discharging the uncondensed vapors into the next of said devices, and means for keeping each of said devices at a constant temperature less than the temperature of those between it and the heating mass.

17. In an apparatus of the character described, the combination with means for heating a mixture of liquids, and means for condensing the vapors, of a plurality of devices arranged intermediate between said means, each for receiving a mixture of vapors, cooling them to a definite temperature, discharging the condensation products back toward the heating means, and discharging the uncondensed vapors into the next of said devices, and means for keeping each of said devices at a constant temperature lower than the temperature of the mixture of vapors which enters it, and higher than the initial boiling point of the mixture of liquids which enters it.

In testimony whereof I have hereunto set my hand, in the presence of two subscribing witnesses.

MARTIN A. ROSANOFF.

Witnesses:
ALBERT E. FAY,
C. FORREST WESSON.

Copies of this patent may be obtained for five cents each, by addressing the "Commissioner of Patents, Washington, D. C."